(12) United States Patent
Lyons

(10) Patent No.: US 9,745,228 B1
(45) Date of Patent: Aug. 29, 2017

(54) COMPOSTING FACILITY

(71) Applicant: McGill Environmental Systems of N.C., Inc., New Hill, NC (US)

(72) Inventor: Michael Noel Lyons, Cary, NC (US)

(73) Assignee: McGill Environmental Systems of N.C., Inc., New Hill, NC (US)

( * ) Notice: Subject to any disclaimer, the term of this patent is extended or adjusted under 35 U.S.C. 154(b) by 0 days.

(21) Appl. No.: 15/485,275

(22) Filed: Apr. 12, 2017

(51) Int. Cl.
  *C05F 17/02* (2006.01)
  *C05F 9/02* (2006.01)

(52) U.S. Cl.
  CPC ............ *C05F 17/0258* (2013.01); *C05F 9/02* (2013.01); *C05F 17/027* (2013.01); *C05F 17/0276* (2013.01)

(58) Field of Classification Search
  CPC ...... B65F 2001/1489; C05F 3/06; C05F 9/02; C05F 11/06; C05F 17/02; C05F 17/0217; C05F 17/0229; C05F 17/0247
  USPC ........................................... 435/290.1–290.4
  See application file for complete search history.

(56) References Cited

U.S. PATENT DOCUMENTS 6,255,102 B1 * 7/2001 Hallsten ................. B01D 24/24
  34/237

* cited by examiner

*Primary Examiner* — Michael Hobbs
(74) *Attorney, Agent, or Firm* — NK Patent Law, PLLC

(57) ABSTRACT

A composting facility includes: a floor for receiving compostable material thereon, wherein the floor is constructed above-grade; a dovetail extending from the floor to allow ingress of a vehicle from a grade level to the floor; one or more channels defined within the floor and extending through the dovetail; a covering extending over the one or more channels to maintain the compostable material away from the channel, the covering defining at least one aperture extending from above the covering into the one or more channels for allowing flowthrough of gases; and an air source for providing air through the channels to provide cooling characteristics to the compostable material or oxygen to aid an aerobic process associated with composting. In operation, liquids draining from the composting material pass through the at least one aperture into the channel and out through a portion of the channel extending through the dovetail.

20 Claims, 7 Drawing Sheets

US 9,745,228 B1

COMPOSTING FACILITY

TECHNICAL FIELD

The present disclosure relates to composting facilities, and more particularly to an above-grade facility having floor channels for ventilation and draining.

BACKGROUND

As environmental awareness improves and conscientious practices are more in demand, large-scale material composting is likely to become more prevalent. Material to be composted in small batches can be turned or churned so as to permit aeration and to help accelerate aerobic processes that serve to decompose the material under treatment. But as the demands for increased bulk and improved efficiencies arise, methods of rotating small batches of material for aeration and maintenance may be found to be cost prohibitive and logistically difficult.

The scale of potential composting needs is likely to support large permanent structure composting facilities that can each process tens if not hundreds of thousands of tons of material yearly. At such scales, aeration to support aerobic composting and the heat production of decomposition will need to be managed.

Liquids can also be released from composting material, posing another challenge to large-scale operations. In some cases, trenches are dug below grade and both aeration and liquid collection are facilitated by the trenches. A trench however is susceptible to liquid accumulation and so further below-grade liquid management is needed such as a sunken collection tank, which requires occasional purging and maintenance.

Improved composting facilities and methods are need for large-scale material composting.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

A composting facility according to at least one embodiment includes: a floor for receiving compostable material thereon, wherein the floor is constructed above-grade; a dovetail extending from the floor to allow ingress of a vehicle from a grade level to the floor; one or more channels defined within the floor and extending through the dovetail; a covering extending over the one or more channels to maintain the compostable material away from the channel, the covering defining at least one aperture extending from above the covering into the one or more channels for allowing flow through of air; and a fan or blower for providing air through the channels to provide temperature control over the compostable material and oxygen to aid the aerobic process associated with composting, wherein, in operation, liquids draining from the composting material pass through at least one aperture into the channel and out through a portion of the channel extending through the dovetail.

In at least one example, the floor includes parallel pads extending in a longitudinal direction, and wherein the channels extend in the longitudinal direction between the pads.

In at least one example, the dovetail includes multiple parallel ramps, each ramp abutting a respective pad and extending in the longitudinal direction therefrom.

In at least one example, each channel is defined along the floor between two of the pads and along the dovetail between two of the ramps.

In at least one example, each channel has a first end that opens in the longitudinal direction at a forward end of the dovetail.

In at least one example, each channel has a second end opposite the first end, and wherein the second end of each channel is closed.

In at least one example, the floor includes a continuous rearward floor section from which the pads extend in the longitudinal direction, and wherein the second ends of the channels are defined at the continuous rearward floor section.

In at least one example, a first sidewall extends in the longitudinal direction along a first lateral side of the floor; and a second sidewall laterally spaced from and parallel to the first sidewall extends in the longitudinal direction along a second lateral side of the floor.

In at least one example, there is a laterally extending end wall from which the first sidewall and second sidewall extend in the longitudinal direction.

In at least one example, the first sidewall includes a first terminal sidewall end; the second sidewall includes a second terminal sidewall end; and an open end of the composting facility opposite the laterally extending end wall is defined between the first terminal sidewall end and second terminal sidewall end.

In at least one example, the dovetail is positioned between the first terminal sidewall end and the second terminal sidewall end.

In at least one example, there is at least one conduit through which the fan or blower provides the air to the channels.

In at least one example, each channel has a bottom that is below the floor and that is at or below the grade level.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

DETAILED DESCRIPTIONS

Figure 1:
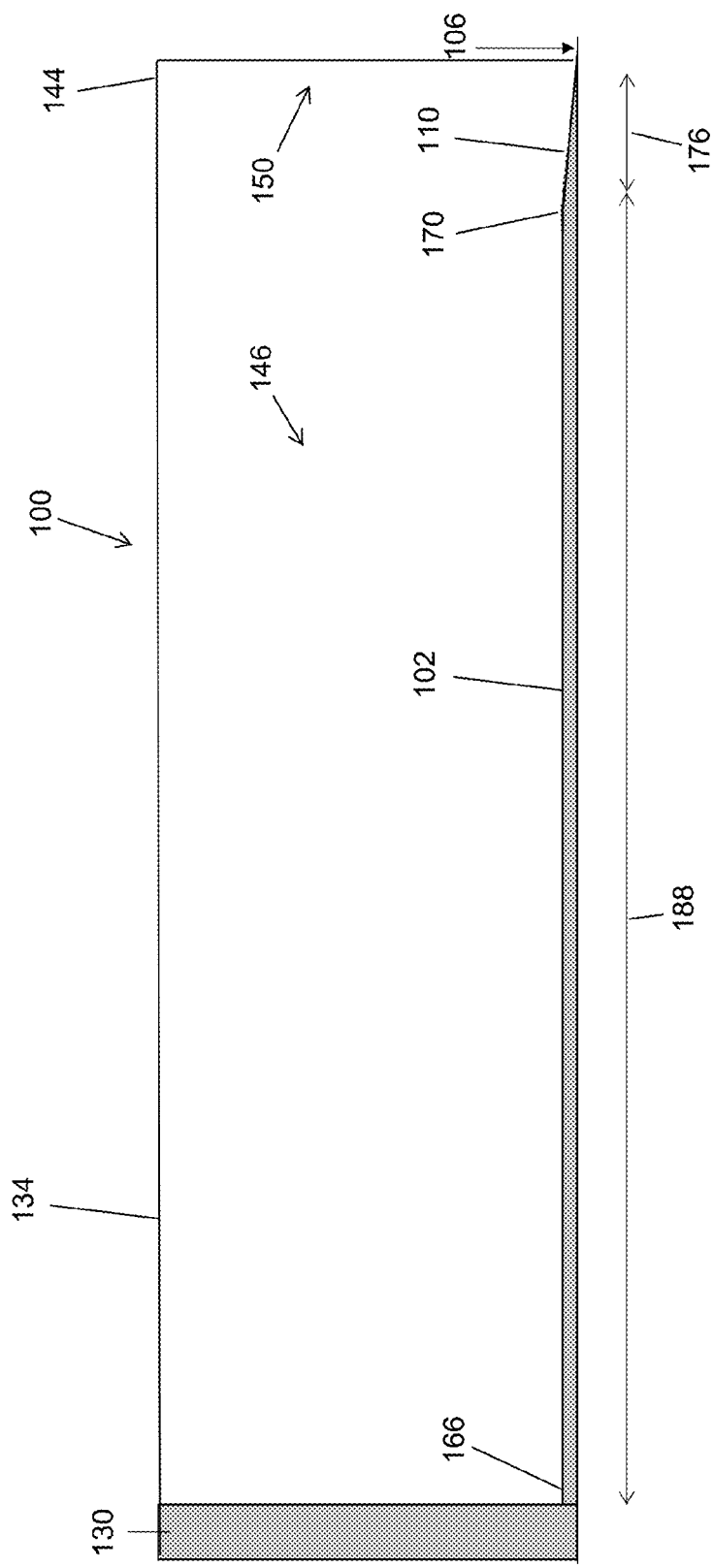
FIG. 1 is a side elevation view of the interior of a composting facility according to at least one embodiment.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Figure 2:
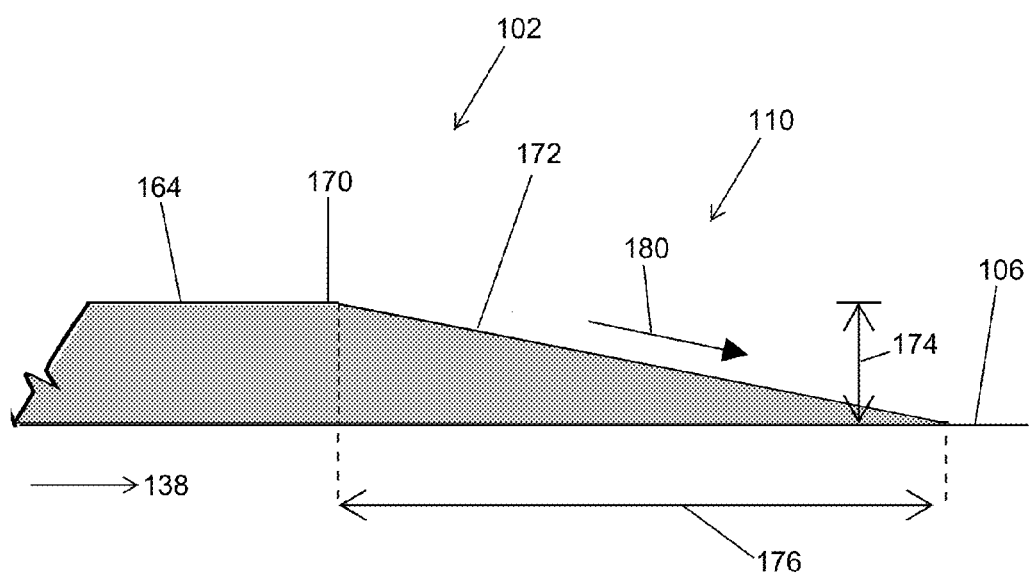
FIG. 2 is a side elevation view of a floor portion and a dovetail of the composting facility of FIG. 1.
Figure 3:
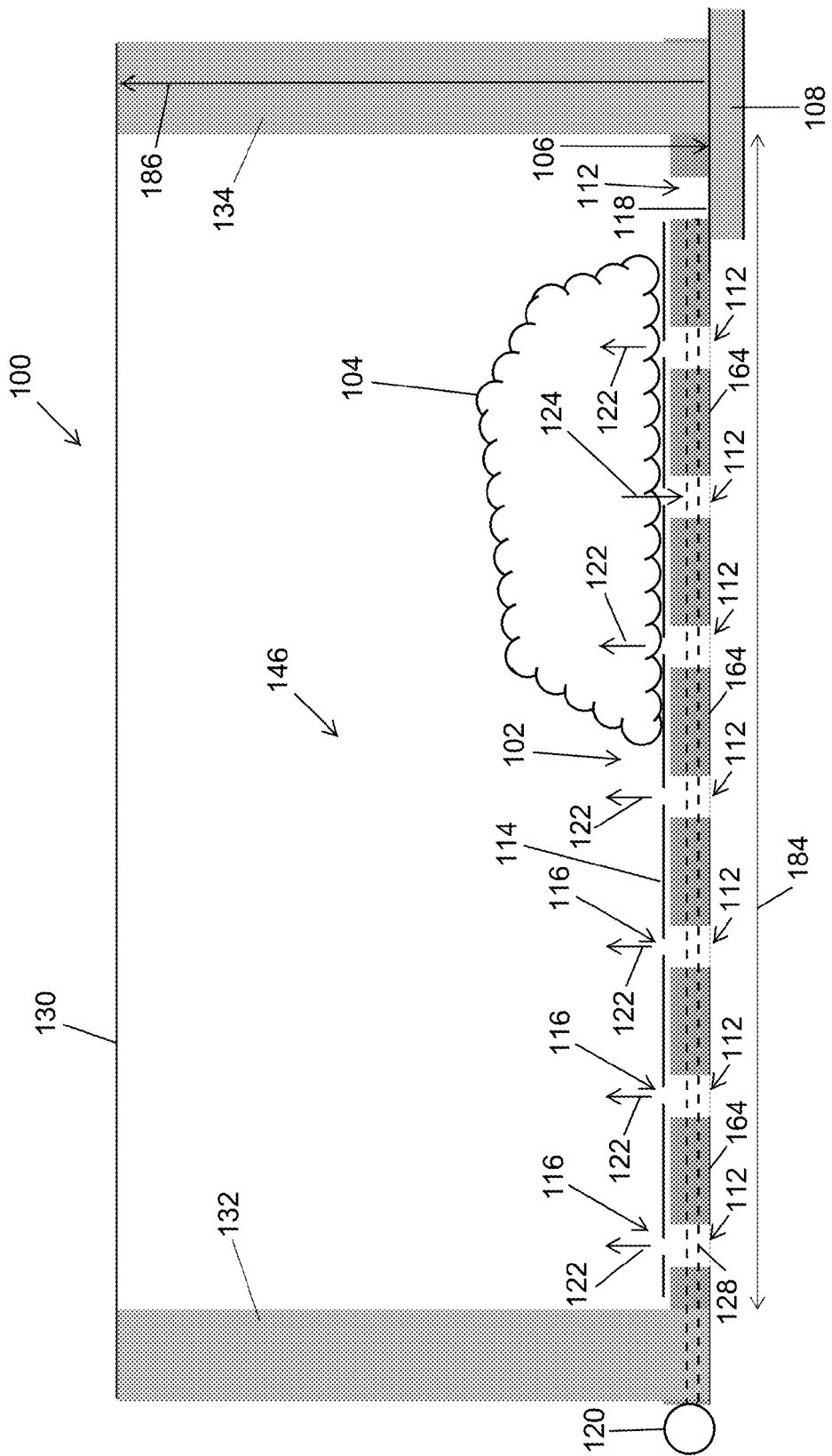
FIG. 3 is a front elevation view directed into the interior of the composting facility of FIG. 1.
Figure 4:
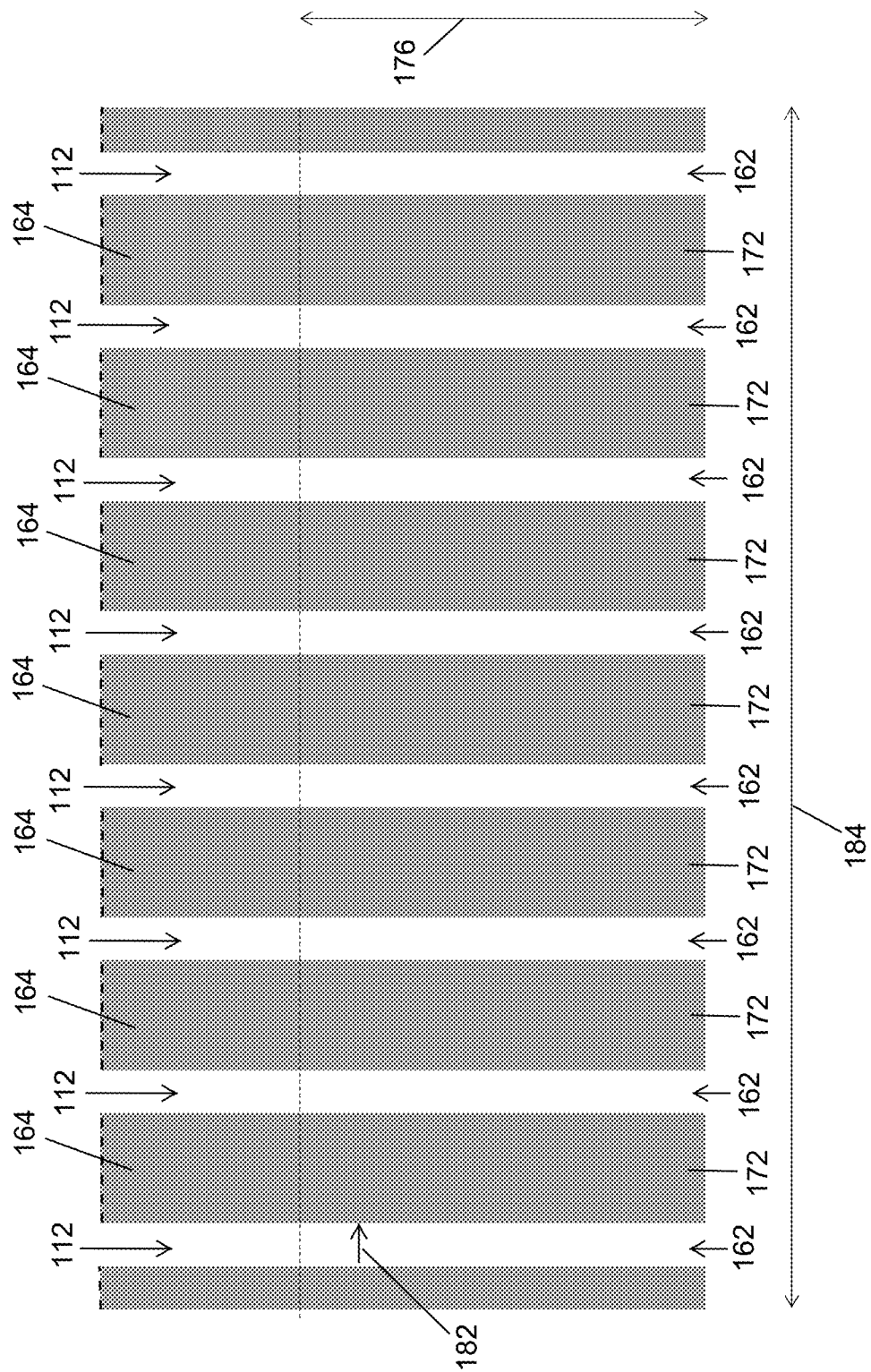
FIG. 4 is a partial plan view of the floor and dovetail of the composting facility of FIG. 1.

A composting facility 100 according to at least one embodiment is shown at least in part in FIGS. 1-6. The composting facility 100 includes a floor 102 for receiving compostable material 104 thereon as shown in FIG. 3. As shown in FIG. 1, the floor 102 may be constructed above grade as represented by ground or grade level 106, representing ground level in an environment around the composting facility 100. As shown in FIG. 2, a ramped dovetail 110 may extend from the floor 102 to allow ingress of a vehicle from the grade level 106 to the floor 102. As shown in FIGS. 3-6, one or more channels 112 may be defined within the floor 102 and extending through the dovetail 110.

As shown in FIG. 3, the composting facility 100 may include a covering 114 extending over the one or more channels 112 to maintain the compostable material 104 away from the channel 112, the covering 114 defining at least one aperture 116 extending from above the covering 114 into the one or more channels 112 for allowing flowthrough of gases and liquids. The covering 114 can be a grate, sieve, or other air and liquid permeable structure.

The composting facility 100 may include an air source 120 for pumping air 122, s through the channels 112 to provide cooling characteristics to the compostable material 104 or oxygen to aid an aerobic process associated with composting. In operation, liquids 124 draining from the composting material 104 pass through the at least one aperture 116 into the channel 112 and out through the portion of the channel extending through the dovetail 110. One more conduits or ducts 128 may be provided through which the air 122 reaches the channels 112 from the air source 120. The air source 120 may be a positive pressure source such as a pump, fan, blower, or pressured line, or can be a passive vent in various examples.

Figure 5:
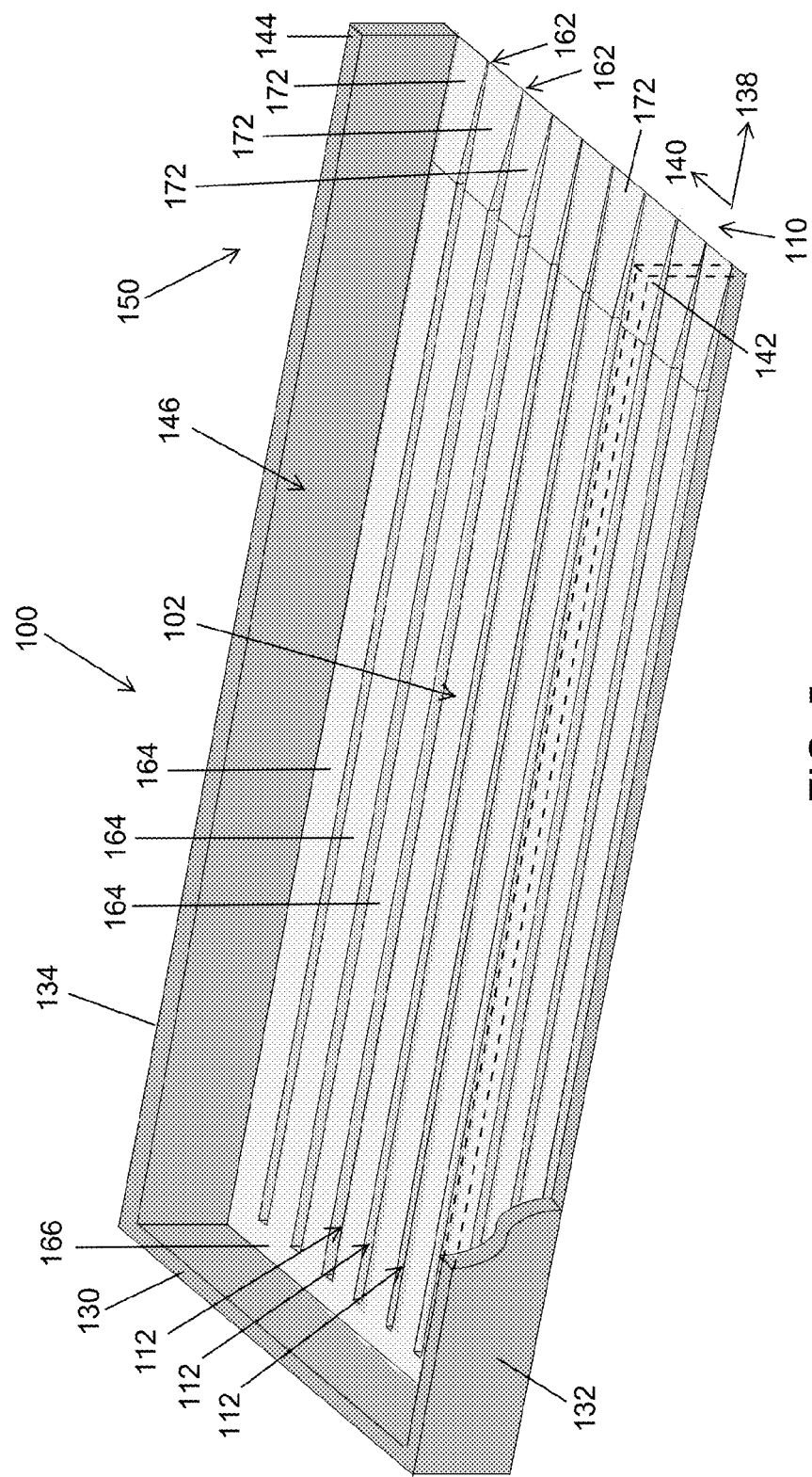
FIG. 5 is a perspective view of the composting facility of FIG. 1 showing a sidewall portion in partial cutaway view.

The composting facility 100 is shown in FIGS. 3 and 5 as having a laterally extending end wall 130, and in FIG. 5 as furthermore having a first longitudinally extending sidewall 132 and a second longitudinally extending sidewall 134 parallel to and laterally spaced from the first sidewall 132. For descriptive purposes, references to longitudinal and lateral are made herein with respect to a longitudinal direction 138 and a lateral direction 140 that is perpendicular to the longitudinal direction 138 as shown in FIG. 5. Accordingly, the first and second sidewalls 132 and 134 extend from the end wall 130 in the forward longitudinal direction 138 to respective terminal sidewall ends 142 and 144 between which the dovetail 110 is arranged.

An interior space 146 of the composting facility 100 is defined above the floor 102 and between first and second sidewalls 132 and 134 from the end wall 130 to and open end 150 of the composting facility 100 opposite the end wall 130. The open end 150 permits entry into the interior space 146 and exit therefrom by vehicles and persons so as to deliver, remove, and service or maintain materials such as the composting material 104 (FIG. 3). The first sidewall 132 is shown in partial cutaway view in FIG. 5.

The longitudinally extending channels 112 in the floor 102 are defined from their closed ends 160 near the end wall 130 to their open ends 162 at the open end 150 of the composting facility 100. The channels 112 extend between longitudinally extending pads 164 of the floor 102. The pads 164 are laterally spaced from each other such that the channels 112 are defined in the spaces between adjacent pads 164. As such, aside from pads 164 or channels 112 closest the sidewalls 132 and 134, each channel 112 is spaced from nearest neighbor channels 112 by two adjacent pads 164, and each pad 164 is spaced from nearest neighbor pads by two adjacent channels 112.

In the illustrated embodiment of the composting facility 100, the pads 164 extend in the forward longitudinal direction 138 from a continuous rearward floor section 166, which is immediately longitudinally forward of and adjacent to the end wall 130. Forward of the rearward floor section 166, upper surfaces of the pads 164 together serve as the load bearing surface of the floor 102.

In the illustrated embodiment, the dovetail 110 is composed of multiple forwardly declining ramps 172. As shown in the enlarged view in FIG. 2, a respective forwardly declining ramp 172 abuts or is connected to the forward end 170 of each pad 164. Each ramp 172 is aligned with its respective pad 164 and extends longitudinally from the forward end 170 of the pad 164 to the grade level 106. The height of the rearward end of the ramp 172 matches the height 174 of the forward end 170 of the pad 164 above the grade level 106. The longitudinal length 176 of the ramp 172 is measured from the forward end 170 of the pad 164 to the forward longitudinal end of the ramp 172 at the grade level 106. A downward slope 180 of the forwardly declining ramp 172 is defined as the ratio of the height 174 in relation to or divided by the longitudinal length 176. Upper surfaces of the ramps 172 together serve as the load bearing surface of the dovetail 110.

The longitudinally extending channels 112 extend along the floor 102 between the pads 164 from their closed ends 160 defined at the continuous rearward floor section 166 near the end wall 130 and further along the dovetail 110 between the ramps 172 to their open ends 162 between the forward ends of the ramps at the open end 150 of the composting facility 100 (FIG. 5).

In operation, composting material 104 (FIG. 3) is carried into the interior 146 of the composting facility 100, for example by loading vehicles traveling up the dovetail 110 (FIG. 1) from the grade level 106, which represents a traffic aisle floor or other driving area. The composting material 104 is deposited and distributed upon the floor 102, with the covering 114 between the composting material 104 and pads 164 so as to prevent solids from filling and blocking the channels 112.

As aerobic processes associated with composting occur within the composting material 104, ventilation is facilitated through the floor 102 as represented by air 122 in FIG. 3. The air source 120 provides air, through the conduits or ducts 128 and into the channels 112 so as to oxygenate and thermally regulate the composting material 104 so as to promote aerobic composting processes while preventing overheating and combustion. The air 122 can travel along the channels 112 and upward through the composting material 104 (FIG. 3) and outward through the open ends 162 (FIG. 5-6) of the channels 112 between the forward ends of the ramps 172 at the open end 150 of the composting facility 100 as well.

Figure 6:
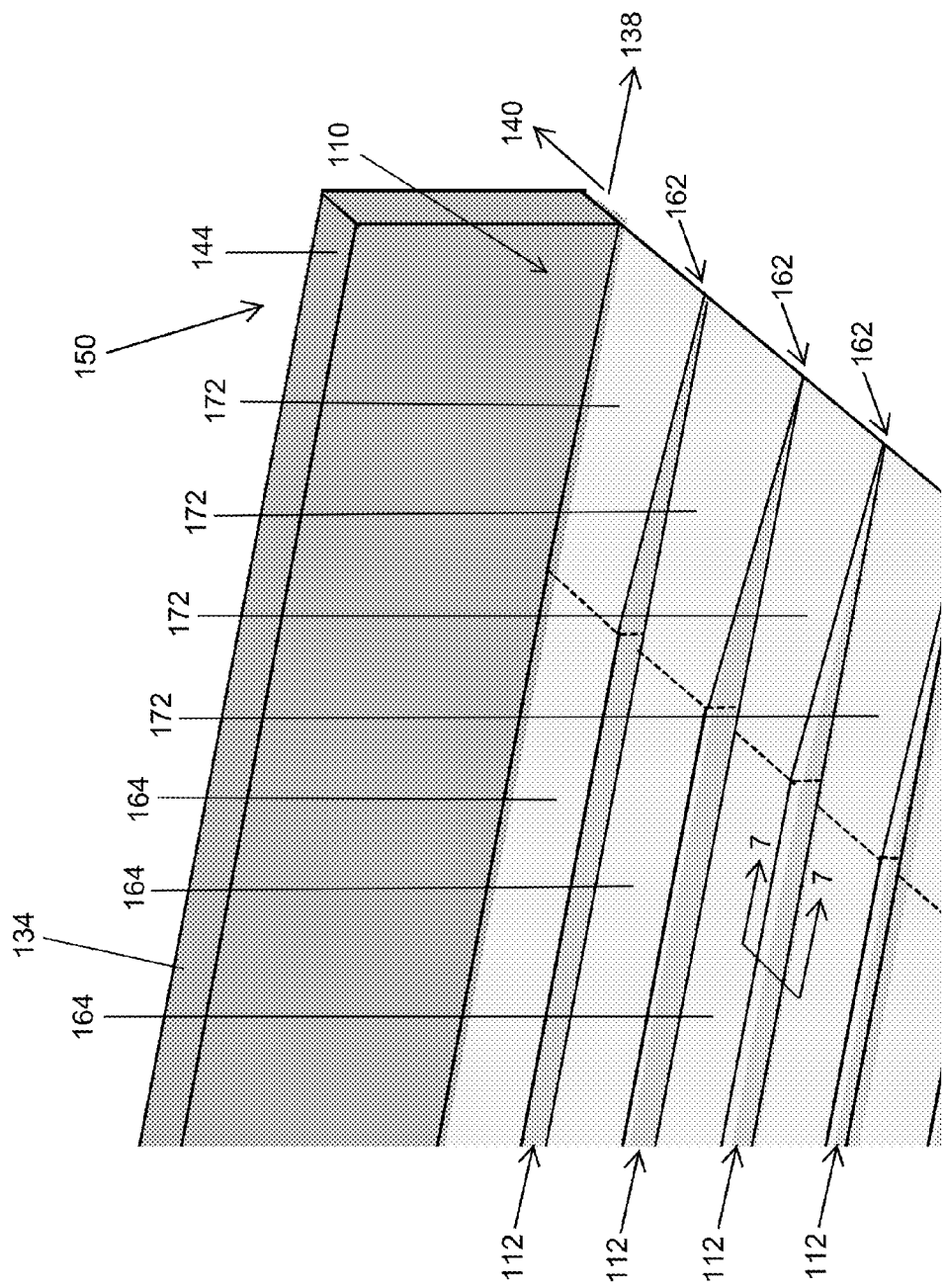
FIG. 6 is an enlarged view of a portion of the perspective view of FIG. 5, showing the dovetail and a forward floor portion.

Liquids 124 (FIG. 3) may drain from the composting material 104 according to the liquid or moisture content of the material. The liquids 124 pass through the covering 114 and along the channels 112 and outward through the open ends 162 of the channels 112 between the forward ends of the ramps 172 at the open end 150 of the composting facility 100 (FIGS. 5-6). The channels 112 permit draining and ventilation even as the ramps 172 and floor 102 are driven over for loading and unloading of the facility.

The number of pads 164 and channels 112 therebetween can vary among examples within the scope of these descriptions and the drawings. Similarly, dimensions of the composting facility 100 can vary among examples. In at least one example, the lateral spacing 182 (FIG. 4) between adjacent pads 164 is five inches, and the height 174 (FIG. 2) of the pads is five inches, thus defining channels having lateral widths, corresponding to spacing 182 in FIG. 4, of five inches and having depths, corresponding to height 174 in FIG. 2, of five inches in that example.

In at least one related example, the height 174 (FIG. 2) of each pad 164 is five inches and the longitudinal length 176 of the ramps 172 is ten feet, thus defining the downward slope 180 of the forwardly declining ramps 172 and dovetail 110 as 1:24.

In at least one example, the lateral width 184 (FIG. 3) of the interior space 146 of the composting facility 100 as measured between the sidewalls 132 and 134 is twenty nine feet. In non-limiting examples, the longitudinal length 188 of the floor 102, as measured from the laterally extending end wall 130 to the forward ends 170 (FIGS. 1-2) of the pads to is between fifty and ninety feet. All dimensions are provided as examples only. The end wall 130 and sidewalls 132 and 134 may have a common height 186 as represented in FIG. 3. In other examples, their heights may be different and may vary.

Advantageously, the composting facility 100 can be an above grade structure. The pads 164 that make the floor 102 and the walls 130, 132 and 134 can all stand above grade level 106. Thus, the bottom 118 of each channel 112, as represented for one example channel 112 in FIG. 3 (see channel 112 closest second sidewall 134), is at or above grade level 106 to promote liquids to drain and exit the facility, specifically for example through the longitudinally forward open ends 162 (FIG. 5-6) of the channels 112.

Advantageously, the longitudinally rearward ends 160 of the channels 112 are closed near the end wall 130. Thus liquid draining of the channels 112 occurs in the single forward longitudinal direction 138 such that any sanitation practices for managing liquids that emanate from the channels can occur in a single area, specifically in the illustrated example along the traffic aisle floor or other driving area longitudinally forward of the compositing facility 100.

A base pad 108 (FIG. 3) lies under the longitudinally extending pads 164 in the illustrated embodiment. The upper surface of the base pad 108 defines the bottom 118 of each channel 112. In the illustrated embodiment, the base pad 108 is sunken such that its upper surface is at grade level 106. Within the scope of these descriptions and drawings, the base pad 108 can be established above grade level 106, further enhancing the draining of the composting facility 100 of any liquids in the channels 112.

The pads 164 that make the floor 102, the walls 130, 132 and 134, and the base pad 108 in at least one example are constructed of concrete, which may be steel-reinforced. The covering 114 can, for example, be a concrete or metal grate. The composting material 104 may be plant material such as leaves and cuttings, while other materials are in the scope of these descriptions.

Figure 7:
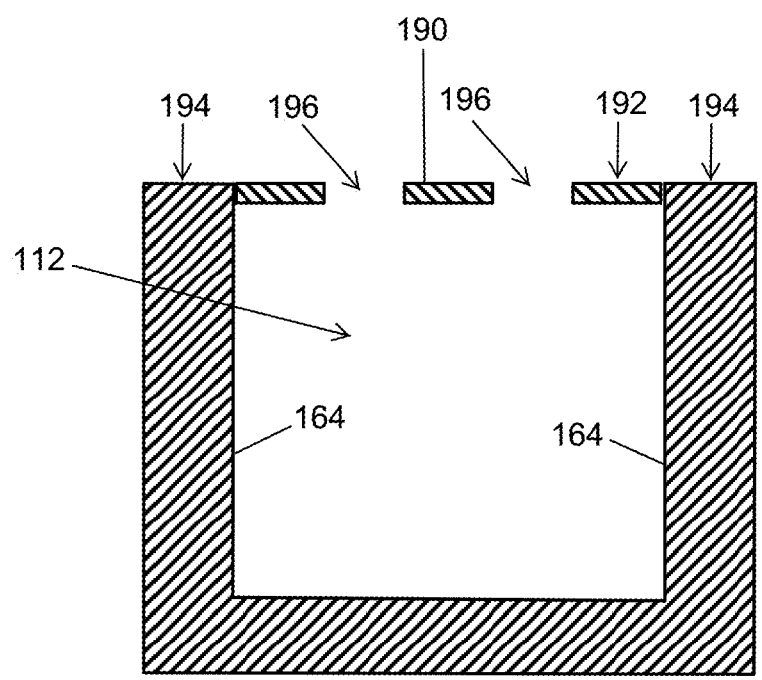
FIG. 7 is a cross-sectional view of a portion of the floor of the composting facility as taken along the line 7-7 in FIG. 6.

In FIG. 3, the illustrated embodiment of the covering 114 is shown as positioned across the floor 102 above the pads 164. In FIG. 7, an alternative embodiment of a covering 190 is shown as positioned in a channel 112 such than an upper surface 192 of the covering 190 is flush with upper surfaces 194 of pads 164 along the sides of the channel 112. The covering 190 has apertures 196 for allowing flow through of air and liquids.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

What is claimed is:

1. A composting facility comprising:
   a floor for receiving compostable material thereon, wherein the floor is constructed above-grade;
   a dovetail extending from the floor to allow ingress of a vehicle from a grade level to the floor;
   two or more channels defined within the floor and extending through the dovetail into an open first end, wherein adjacent channels are separated by parallel-oriented pads extending in a longitudinal direction along a same horizontal plane, and wherein the channels extend in the longitudinal direction in a space defined between adjacent pads running along at least a partial longitudinal length of the floor towards the dovetail;
   a covering extending over one of the channels to maintain the compostable material away from the channel, the covering defining at least one aperture extending from above the covering into the one or more channels for allowing flowthrough of gases; and
   an air source for providing air through the channels to provide cooling characteristics to the compostable material or oxygen to aid an aerobic process associated with composting, wherein the air source provides air to a second end of the channel and the air exits through the open first end defined in the dovetail,
   wherein, in operation, liquids draining from the compostable material pass through the at least one aperture into the channel and out through the open first end of the channel that extends through the dovetail.

2. The composting facility of claim 1, wherein the dovetail comprises multiple parallel, adjacent ramps, each ramp abutting a respective pad and extending in the longitudinal direction therefrom.

3. The composting facility of claim 2, wherein each channel is defined along the floor between two of the pads and along the dovetail between two of the ramps.

4. The composting facility of claim 3, wherein the second end of each channel is in communication with the air source.

5. The composting facility of claim 4, wherein the floor comprises a continuous rearward floor section from which the pads extend in the longitudinal direction, and wherein the second ends of the channels are defined at the continuous rearward floor section.

6. The composting facility of claim 2, further comprising:
a first sidewall extending in the longitudinal direction along a first lateral side of the floor; and
a second sidewall laterally spaced from and parallel to the first sidewall and extending in the longitudinal direction along a second lateral side of the floor.

7. The composting facility of claim 6, further comprising a laterally extending end wall from which the first sidewall and second sidewall extend in the longitudinal direction.

8. The composting facility of claim 7, wherein:
the first sidewall comprises a first terminal sidewall end;
the second sidewall comprises a second terminal sidewall end; and
an open end of the composting facility opposite the laterally extending end wall is defined between the first terminal sidewall end and second terminal sidewall end.

9. The composting facility of claim 8, wherein the dovetail is positioned between the first terminal sidewall end and the second terminal sidewall end.

10. The composting facility of claim 1, further comprising at least one conduit through which the air source provides the air to a respective channel, wherein the at least one conduit is positioned within a respective channel and extending along the length thereof.

11. The composting facility of claim 1, further comprising:
a first sidewall extending along a first side of the floor;
a second sidewall spaced from and parallel to the first sidewall and extending along a second side of the floor opposite the first side; and
an end wall from which the first sidewall and second sidewall extend.

12. The composting facility of claim 11, wherein an open end of the composting facility is defined opposite the end wall.

13. The composting facility of claim 1, wherein the dovetail comprises multiple ramps between which the channels extend.

14. The composting facility of claim 1, wherein each channel has an open channel end defined at the dovetail and a closed end opposite the open channel end.

15. The composting facility of claim 1, wherein each channel has a bottom that is below the floor and that is at or below the grade level.

16. The composting facility of claim 1, wherein each pad extends along an entire length of the longitudinal direction and is formed from a continuous material.

17. The composting facility of claim 1, wherein the open first end is not covered by compostable material.

18. The composting facility of claim 1, wherein the covering and a topmost portion of an adjacent pad are defined in a same horizontal plane.

19. A composting facility comprising:
a floor for receiving compostable material thereon, wherein the floor is constructed above-grade;
a dovetail extending from the floor to allow ingress of a vehicle from a grade level to the floor;
two or more channels defined within the floor and extending through the dovetail into an open first end, wherein adjacent channels are separated by parallel-oriented pads extending in a longitudinal direction along a same horizontal plane, and wherein the channels extend in the longitudinal direction in a space defined between adjacent pads running along at least a partial longitudinal length of the floor towards the dovetail,
wherein each pad extends along an entire length of the longitudinal direction and is formed from a continuous material;
a covering extending over one of the channels to maintain the compostable material away from the channel, the covering defining at least one aperture extending from above the covering into the one or more channels for allowing flow through of gases; and
an air source for providing air through the channels to provide cooling characteristics to the compostable material or oxygen to aid an aerobic process associated with composting, wherein the air source provides air to a second end of the channel and the air exits through the open first end defined in the dovetail,
wherein, in operation, liquids draining from the compostable material pass through the at least one aperture into the channel and out through the open first end of the channel that extends through the dovetail,
wherein the open first end is not covered by compostable material,
wherein the covering and a topmost portion of an adjacent pad are defined in a same horizontal plane.

20. A composting facility comprising:
a floor for receiving compostable material thereon;
a dovetail extending from the floor to allow ingress of a vehicle from a grade level to the floor;
two or more channels defined within the floor and extending through the dovetail into an open first end defined in the dovetail, the channels being surrounded on a bottom surface and adjacent wall surfaces by respective adjacent pads running along at least a partial length of the floor towards the dovetail, wherein the topmost surface of the pads form a surface of the floor;
a permanent wall structure at an end opposite to the dovetail;
a covering extending over one of the channels to maintain the compostable material away from the channel, the covering defining at least one aperture extending therethrough for allowing flowthrough of gases; and
an air source for providing air through the channels to provide cooling characteristics to the compostable material or oxygen to aid an aerobic process associated with composting, wherein the air source provides air along a length of the channel in a direction extending from a second end to the open first end,
wherein, in operation, liquids draining from the compostable material pass through the at least one aperture into the channel and out through the open first end of the channel that extends through the dovetail when the open first end is not covered by compost,
wherein the open first end is not covered by compostable material,
wherein the covering and a topmost portion of an adjacent pad are defined in a same horizontal plane and collectively form a surface of the floor onto which compost is placed.

* * * * *